Jan. 4, 1938.    F. MARASSO    2,104,431
PROOFER TRAY
Filed Nov. 26, 1935
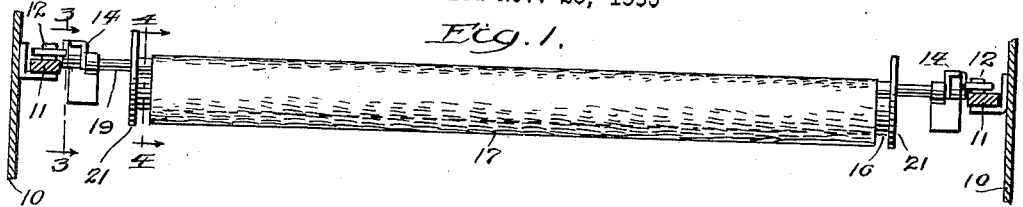
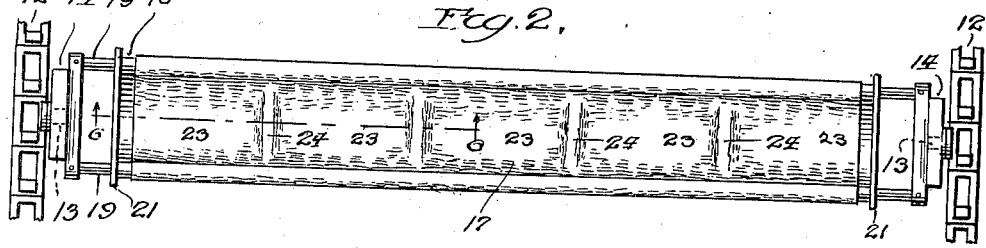
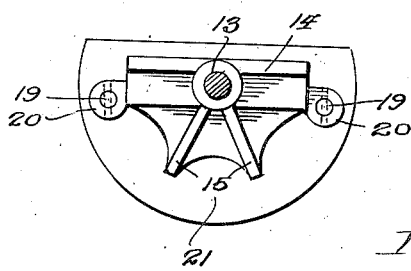
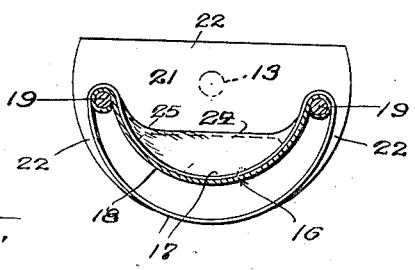
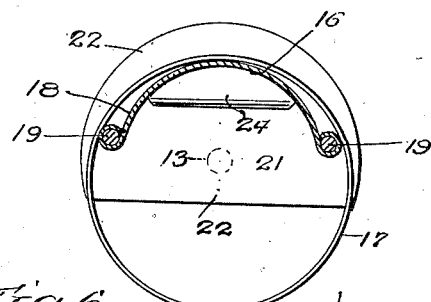
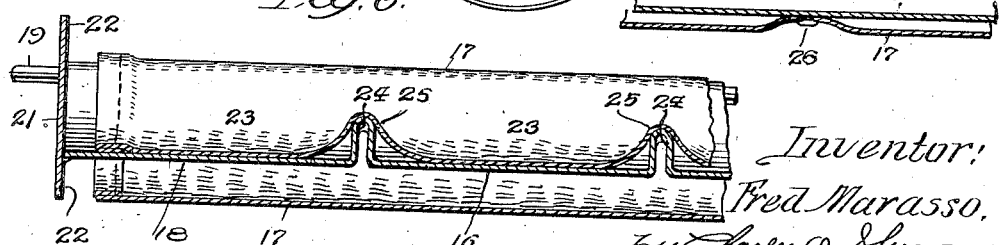
Inventor:
Fred Marasso,
By Charles O. Shurney
His Atty.

Patented Jan. 4, 1938

2,104,431

UNITED STATES PATENT OFFICE 2,104,431

PROOFER TRAY

Fred Marasso, Joliet, Ill., assignor to Union Machinery Company, Joliet, Ill., a corporation of Illinois Application November 26, 1935, Serial No. 51,653

10 Claims. (Cl. 198—152)

This invention relates to proofer trays and has reference more particularly to proofer trays that employ liners for preventing the lumps of dough from adhering to them. Trays of this character are employed in proofing apparatus for the purpose of conveying lumps of dough through the proofing chamber thereof and are usually rotatively carried by conveyor chains, one located at each end of the trays and traveling upon suitable rails and around sprocket wheels contained in the proofing chamber.

One of the objects of this invention is to provide a tray with means to prevent the liner from creeping endwise beyond the tray, thereby preventing the liner from being caught upon the chains or caught by the sprocket wheels over which the chains travel.

Another object is to provide a tray with a liner that is capable of creeping circumferentially about the tray, but incapable of endwise movement beyond the ends of the tray.

Another object is to provide transverse members in the tray for dividing it into several pockets, whereby the liner is dented upwardly by the transverse members so as to form individual pocket liners for the several lumps of dough.

Another object is to provide means whereby dusting flour may readily escape between the ends of the trays and the conveyor chains.

Other objects and advantages will appear in the course of the following specification, and with all of said objects and advantages in view, this invention consists in the several novel features of construction, arrangement and combination of parts hereinafter fully set forth and more particularly defined in the claims.

The invention is clearly illustrated in the drawing accompanying this specification, in which:—

Fig. 1 is a side elevation of a proofer tray, embodying a simple form of the present invention, a fragment of a proofer cabinet and rails being shown in vertical cross-section;

Fig. 2 is a plan of the proofing tray and fragments of the conveyor chains;

Fig. 3 is a view of the proofing tray, partly in end elevation and partly in cross section, taken on the line 3—3 of Fig. 1;

Fig. 4 is a vertical, cross-section, taken on the line 4—4 of Fig. 1;

Fig. 5 is a view similar to Fig. 4, but showing the tray in inverted position;

Fig. 6 is a fragmental, vertical, longitudinal section, taken on the line 6—6 of Fig. 2; and Fig. 7 is a fragmental, vertical, longitudinal section, through a slightly modified form of the invention.

Referring to said drawing and first to Figs. 1 to 6, inclusive, the reference characters 10, 10 designate the side walls of the proofing cabinet of a proofer of ordinary construction, upon which walls are mounted rails 11. Traveling upon said rails and around the sprocket wheels (not shown) mounted in the proofing chamber, are conveyor chains 12, which are driven by suitable means and convey the trays through the proofing chamber from its receiving end to its discharge end, as is well known.

At suitably spaced intervals along the length of the conveyor chain, the links are provided with oppositely disposed pivot pins 13 which pivotally support the proofer trays so that they may be inverted at the discharge end for the purpose of discharging the lumps of dough therefrom.

Hanger blocks 14 are provided for carrying trays and said hanger blocks are formed with bearing apertures to receive the pins 13 and are also provided with wings 15 which engage the tray inverting mechanism (not shown).

The proofer tray forming the subject matter of this specification, comprises a plural pocket tray 16 and a sleeve-like liner 17 composed of textile fabric which surrounds the tray and is of considerably greater circumferential dimensions than that of the tray, whereby it is free to creep around the tray.

The tray is desirably formed of a sheet metal, trough-like body 18, preferably of substantially semi-circular form in cross-section, the side edges of which are curled around rods 19 that project beyond the ends of the tray and are rigidly secured in ears 20 formed at the ends of the hanger blocks 14. The ends of the tray are desirably formed of sheet metal end pieces 21, soldered to the end edges of the tray body and to the rods 19. The edge portions of the end pieces project beyond the top, sides and bottom of the body of the tray and provide flanges 22 that project laterally from the body of the tray and serve as guards to prevent the liner from creeping beyond the ends thereof.

The circumference of the end pieces may be slightly greater than the circumference of the liner, so that at no time can the liner accidentally creep over the end pieces. As shown, the upper edges of the end pieces may be straight, but this is immaterial. The side and bottom edges are desirably circular, and parallel the sides and bottom of the body of the tray.

Spaces are left between the end pieces 21 of the tray and the hanger blocks 14, which permit dusting flour to freely fall through said spaces instead of lodging upon the rails and conveyor chains.

The invention is shown in connection with a plural pocket tray adapted to convey several lumps of dough at a time. The individual pockets may be formed by providing transverse members across the hollow of the tray and, as shown, said transverse members are formed by stamping the material of the tray upward at spaced intervals along its length, as at 24, thereby providing low partitions between individual pockets, designated by 23. At the places where the liner extends across the partitions, the liner is dented upwardly, as at 25, thereby leaving depressed portions in the pockets between the partitions for receiving the individual lumps of dough.

When the tray is loaded, the upper portion of the liner rests upon the bottom of the tray, except at the partitions, where it is dented upwardly, and the lumps of dough are thereby held in the several pockets in spaced relation to each other. The lower half of the liner hangs down considerably below the bottom of the tray, but it is prevented from creeping endwise beyond the tray by the flanges 22 of the end pieces 21. When the tray is inverted, as seen in Fig. 5, the liner then rests upon the inverted tray and the lumps of dough are discharged therefrom, the flanges 22 serving to prevent the liner from creeping beyond the ends of the tray and becoming caught by the chains or sprocket wheels.

The circumferential movement of the liner about the tray, which is imparted to it upon rotation of the tray, is confined to the space between the flanges at the ends thereof, because in all of the positions assumed by the liner its ends will encounter the flanges at the ends of the tray.

Each time that the tray is inverted, the liner creeps circumferentially about the tray, so as to present a new place thereon for other lumps of dough to rest upon.

In the modified form of the invention illustrated in Fig. 7, the liner 17 is prevented from creeping endwise on the tray by a button or other fastening device 26, secured to the lower side of the tray and engaging in a button hole or coacting fastening device in the liner. In this form of the invention, the liner does not creep circumferentially about the tray, but it is prevented from creeping lengthwise beyond the ends thereof.

More or less variation of the exact details of construction is possible without departing from the spirit of this invention; I desire, therefore, not to limit myself to the exact form of the construction shown and described, but intend, in the following claims to point out all of the invention disclosed herein.

I claim as new and desire to secure by Letters Patent:

1. A proofer tray, comprising in combination, a rotatively mounted plural pocket tray, a sleeve-like liner of greater length than its width, composed of textile fabric surrounding the tray, the circumference of the liner being of sufficient extent to permit it to lie on the bottom of the tray when in upright position, and means on the tray to prevent the liner from creeping beyond the ends thereof.

2. A proofer tray, comprising in combination, a rotatively mounted solid bottom plural pocket tray having flanges at its ends, which project laterally beyond the top, bottom and sides of the tray, and a sleeve-like liner of greater length than its width, composed of textile fabric loosely surrounding the tray and held thereon by said flanges against endwise movement beyond the ends of the tray, the liner being free to creep circumferentially around the tray.

3. A proofer tray, comprising in combination, a rotatively mounted tray having spaced transverse members therein of less height than the body of the tray, dividing the same into a plurality of pockets, and a sleeve-like liner of greater length than its width, composed of textile fabric loosely surrounding the tray and arranged to be dented upwardly by said transverse members, whereby to form separate depressions in the liner.

4. A proofer tray, comprising in combination, a rotatively mounted solid bottom tray having spaced transverse members therein of less height than the body of the tray, dividing the same into a plurality of pockets, a sleeve-like liner of greater length than its width, composed of textile fabric loosely surrounding the tray and arranged to be dented upwardly by said transverse members, whereby to form separate depressions in the liner, and means to prevent the liner from creeping lengthwise beyond the ends of the tray.

5. A proofer tray, comprising in combination, a rotatively mounted tray having spaced transverse members therein of less height than the body of the tray, dividing the same into a plurality of pockets, a sleeve-like liner of greater length than its width, composed of textile fabric loosely surrounding the tray and arranged to be dented upwardly by said transverse members, whereby to form separate depressions in the tray, and laterally projecting flanges at the ends of the tray for preventing the liner from creeping beyond the ends of the tray, the liner being free to creep circumferentially around the tray.

6. A proofer tray, comprising in combination, a rotatively mounted tray having partitions of less height than the body of the tray, dividing the same into a plurality of pockets, and a sleeve-like liner of greater length than its width, composed of textile fabric loosely surrounding the tray and arranged to be dented upwardly by said partitions, whereby to form separate depressions in the liner.

7. A proofer tray, comprising in combination, a rotatively mounted tray having partitions dividing the same into a plurality of pockets, a sleeve-like liner of greater length than its width, composed of textile fabric loosely surrounding the tray and arranged to be dented upwardly by said partitions, whereby to form separate depressions in the liner, and means on the tray to prevent the liner from creeping lengthwise beyond the ends of the tray.

8. A proofer tray, comprising in combination, a rotatively mounted tray having a plurality of partitions of less height than the body of the tray, struck up from the material thereof and dividing the same into a plurality of pockets, and a sleeve-like liner of greater length than its width, composed of textile fabric loosely surrounding the tray and arranged to be dented upwardly by said partitions, whereby to form separate depressions in the tray.

9. A proofer tray, comprising in combination, a plural pocket tray having rolled side edges, rods secured in said rolled edges and projecting beyond the ends thereof, a sleeve-like liner composed of textile fabric loosely surrounding the tray, means to prevent endwise movement of the liner beyond the ends of the tray, hanger blocks spaced from the ends of the tray and fastened upon the ends of said rods, and conveyor chains at the sides of the hanger blocks, upon which the latter are rotatively mounted.

10. A proofer tray comprising a plural pocket tray, a sleeve-like liner of greater length than its width, composed of textile fabric surrounding the tray, and co-acting fastening means on the tray and liner for preventing endwise movement of the liner.

FRED MARASSO.